US012512930B2

(12) United States Patent
Doon et al.

(10) Patent No.: US 12,512,930 B2
(45) Date of Patent: Dec. 30, 2025

(54) SYSTEM AND METHOD FOR MANAGEMENT OF RESPONSE TIME

(71) Applicant: Jio Platforms Limited, Ahmedabad (IN)

(72) Inventors: Abhishek Doon, Navi Mumbai (IN); Jitendra Soni, Navi Mumbai (IN); Gaurav Jain, Navi Mumbai (IN); Mukesh Singh, Dombivali (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 760 days.

(21) Appl. No.: 17/638,763

(22) PCT Filed: Aug. 26, 2020

(86) PCT No.: PCT/IB2020/057956
§ 371 (c)(1),
(2) Date: Feb. 25, 2022

(87) PCT Pub. No.: WO2021/038455
PCT Pub. Date: Mar. 4, 2021

(65) Prior Publication Data
US 2022/0271869 A1   Aug. 25, 2022

(30) Foreign Application Priority Data
Aug. 26, 2019   (IN) .............................. 201921034248

(51) Int. Cl.
*H04L 1/18* (2023.01)
*H04W 28/12* (2009.01)
*H04W 68/02* (2009.01)

(52) U.S. Cl.
CPC ............... *H04L 1/18* (2013.01); *H04W 28/12* (2013.01); *H04W 68/02* (2013.01)

(58) Field of Classification Search
CPC .............. H04W 24/04; H04W 28/12; H04W 68/005; H04W 68/02; H04W 76/12; H04W 76/28;
(Continued)

(56) References Cited

U.S. PATENT DOCUMENTS 10,212,690 B1 * 2/2019 Lau ........................ H04W 64/00
10,869,185 B2   12/2020 Rönneke
(Continued)

FOREIGN PATENT DOCUMENTS

KR   20190065353 A   6/2019
WO   2021/038455       3/2021

OTHER PUBLICATIONS

International Search Report from International Appl. No. PCT/IB2020/057956, mailed Nov. 12, 2020.
(Continued)

*Primary Examiner* — Michael Thier
*Assistant Examiner* — Prince A Mensah
(74) *Attorney, Agent, or Firm* — FINNEGAN, HENDERSON FARABOW, GARRETT & DUNNER, LLP

(57) ABSTRACT

A system and method for management of response time to the at least one NB-IoT device. The method comprises receiving, at an MME from a SCEF, at least one mobile terminal data request (TDR). The method thereafter comprises buffering, at the MME, each of the received at least one TDR. Further, the method comprises calculating, by the MME, a requested retransmission time (RRT) for each of the buffered at least one (TDR). The method thereafter comprises transmitting, from the MME to the SCEF, at least one mobile terminal data answer (TDA) corresponding to each of the buffered at least one TDR for management of response time to the at least one NB-IoT device, wherein the at least (Continued)

one TDA comprises of at least the calculated RRT for each of the corresponding buffered at least one TDR.

10 Claims, 3 Drawing Sheets

(58) Field of Classification Search
CPC ..... H04L 1/08; H04L 1/12; H04L 1/18; H04L 1/1809
See application file for complete search history.

(56) References Cited

U.S. PATENT DOCUMENTS

| 2018/0368202 A1* | 12/2018 | Landais | H04W 48/12 |
| 2019/0253870 A1* | 8/2019 | Rönneke | H04W 76/25 |
| 2020/0280865 A1* | 9/2020 | Foti | H04W 4/70 |
| 2020/0296665 A1* | 9/2020 | Huang | H04W 4/70 |

OTHER PUBLICATIONS

"LTE; Universal Mobile Telecommunications System (UMTS); Mobile Management Entity (MME) and Serving GPRS Support Node (SGSN) Interfaces for Interworking with Packet Data Networks and Applications", 3GPP TS 29.128 Version 13.3.0, Release 13, Jan. 17, 2017 (Jan. 17, 2017) Section 5.6; Tables 5.6.1-1, 5.6.1-2.

* cited by examiner

SYSTEM AND METHOD FOR MANAGEMENT OF RESPONSE TIME

This application is a national stage filing under 35 U.S.C. § 371 of International Application No. PCT/IB2020/057956, filed on Aug. 26, 2020, which claims the benefit of priority to Indian Application No. IN201921034248, filed on Aug. 26, 2019; the contents of these applications are each incorporated herein by reference.

TECHNICAL FIELD

The present invention generally relates to the field of wireless network and more particularly to a system and method for management of response time to at least one Narrow Band-Internet of Things (NB-IoT) device based on inclusion of a Requested Retransmission Time (RRT) in an MT (Mobile Terminal) Data Answer (TDA).

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In a traditional cellular deployment, suitable powered macrocells are being deployed to cover sufficiently large areas. However, with macrocells only deployment, it generally suffers from quick capacity degradation as the number of user equipment (UE) operating in the macrocells coverage areas increase. Therefore, operators are now reinforcing their macrocells deployment with one or multiple low powered small cellular cells (generally termed as Femto/Pico/Microcells) placed at multiple strategic locations within one or more macro coverage areas. This kind of reinforced cellular network is generally termed as a heterogeneous network, in short, HetNet. For a typical HetNet, strategic locations for small cells generally include areas with a high density of users, such as shopping malls, airports, railway/bus stations, colleges, etc. Also, these locations might include an area with dead-spots, or areas with low macro signal strength, such as indoor establishments or peripheral locations of a macro coverage area. Reinforced with small cells placed at multiple strategic locations as described above, the heterogeneous networks not only provide the increased mobile data capacity but also provide better mobile coverage, thereby enhancing the overall user's mobile broadband experience. Also, in the mobile communication network, it may often be difficult for the operators to cater higher per-user throughput and/or maintain acceptable signal quality through the homogeneous deployment of only Macro Base Stations, in areas of high user density and/or high building penetration loss. The Small Base Station/Small Cell when used along with Macro Base Stations serve the dual purpose of enhanced capacity and coverage as well as reduced CAPEX/OPEX cost. The Small Cell is an umbrella term for low powered base-stations (access points) having a relatively smaller range compared to Macro Base Station and deployed in hotspots or covered indoor environments like homes, offices, shopping complexes etc. The service operator is increasingly deploying Small Base Stations in larger numbers to cater to the localized area of high user density e.g. offices, shopping complexes etc.

Since the deployments of 4G communication systems, the demand for wireless data traffic have increased exponentially and efforts have been made to develop an improved 5G or pre-5G communication system, also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and to increase the transmission distance, a beamforming, a massive multiple-input multiple-output (MIMO), a full dimensional MIMO (FD-MIMO), an array antenna, an Analog beam forming, a large scale antenna and the like techniques are discussed in 5G communication systems. In, addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Also, 3GPP has recently introduced a new technology NB-IoT in release 13. The low-end IoT applications can be met with this technology. This technology has better performance than Low Power Wide Area (LPWA). It has taken efforts to address IoT markets with completion of standardization on NB-IoT. The NB-IoT technology has been implemented in licensed bands. The licensed bands of LTE are used for exploiting this technology. This technology makes use of a minimum system bandwidth of 180 kHz i.e. one PRB (Physical Resource Block) is allocated for this technology. The NB-IoT can be seen as a separate RAT (Radio Access Technology) and it can be deployed in 3 modes namely "in-band", "guard band" and "standalone". In the "in-band" operation, resource blocks present within LTE carrier is used. The inner resource blocks are not used as they are allotted for synchronization of LTE signals. In "guard band" operation, resource blocks between LTE carriers that are not utilized by any operator are used. In "standalone" operation, GSM frequencies are used, or possibly unused LTE bands are used. Furthermore, the release 13 contains important refinements like discontinuous reception (eDRX) and power save mode. The PSM (Power Save Mode) ensures battery longevity (in release 12) and is completed by eDRX for devices that need to receive data more frequently.

Furthermore, the NB-IoT technology focuses on devices like meter reading of water and electricity consumption that are stationery. Some exemplary use cases are facility management services, fire alarms for home and commercial properties, tracking of persons and objects etc. Some of the industries where NB-IoT services can add value are the smart city, smart home, safety and security, agriculture, health care and energy. Also, another example for IoT industry includes logistic tracking, where the tracking devices on shipping containers send huge volumes of sensor data that are collected and taken for analysis in order to make sure that real-time tracking of shipment locations can be made possible. The output display units are used for receiving alerts and are optimized with service recommendations.

Further, the Power Saving Mode (PSM) capability is focused on reducing the power consumption of a UE (NB-IoT device), also it is defined for both LTE and GSM technologies and it enables devices to enter deep sleep mode. The PSM is intended for UEs designed for infrequent data transmission and that can accept a corresponding latency in the mobile terminating communication. Further, with the PSM approach, the UE decides how often and for how long it needs to be active in order to transmit and receive data. The PSM mode is similar to power-off, but the UE remains registered with the network. This means that when the UE becomes active again, there is no need to re-attach or re-establish the packet data network (PDN) connections. While the UE is in PSM mode, it is not reachable for mobile terminating services, but the network is aware of this and avoids paging the UE in vain, However, it is available for mobile terminating services during the time that the UE is in connected mode and for a period of active time after the connected mode is established. The UE requests the PSM simply by including a timer (T3324) with the desired value in the attach, tracking area update (TAU) or routing area update. The T3324 will be the time the UE listens to the paging channel after having transitioned from connected to idle mode. When the timer expires, the UE enters PSM. The UE can also include a second timer, which is an extended T3412 in order to remain in PSM for longer than the T3412 broadcast by the network. The network accepts PSM by providing the actual value of the T3324 (and T3412) to be used in the attach/TAU/RAU accept procedure. The maximum duration, including T3412, is about 413 days. Also, T3324 is used as an active time for PSM and T3412/T3412_ext is used for sleep duration of PSM.

Further, the extended idle-mode discontinuous reception (eDRX) is another mechanism that reduces power consumption of the device/NB-IoT device by extending the sleeping cycle in idle mode. It allows the device to turn part of its circuitry off during the extended DRX period to save power. During the extended DRX, the device is not listening for paging or downlink control channels, so the network should not try to contact the device. The main difference with PSM is that this capability is useful for mobile terminating data, with a delayed reachability compared to current DRX. To achieve the same degree of mobile terminating services reachability with PSM, a UE should exit PSM and issue periodic TAU/RAU with the same frequency as the extended idle mode DRX cycle, thus causing additional signalling for the network and power consumption in the UE. The UE can request the use of extended idle-mode DRX cycle (eDRX) during an attach, tracking area updating (TAU) or routing area updating (RAU) procedure by including the eDRX parameters IE.

Further, in line with this, various attempts have been made to apply 5G communication systems to IoT networks. For example, technologies such as a sensor network, machine type communication (MTC), and machine-to-machine (M2M) communication may be implemented. Application of a cloud radio access network (RAN) and big data processing technology may also be considered to be as an example of convergence between the 5G technology and the IoT technology. Meanwhile, an LTE system may determine whether to perform application-specific access barring and control accesses per application, However, the complicating application-specific access barring mechanism gives rise to the necessity of a consistent access control mechanism.

Furthermore, in an event of a paging failure, it has been observed that a mobility management entity (MME) (or for instance in an implementation a vMME (virtualized MME)) does not include RRT (Requested Retransmission Timer) in a mobile terminal data answer (TDA) towards a service capability exposure function (SCEF). The error code sent towards the SCEF in case of paging failure is DIAMETER_ERROR_UNREACHABLE_USER (4221). Also, the currently known arts does not have the feature which can include the RRT in all the TDA message which shall be sent to SCEF in case of paging failure with the correct error code. Furthermore, at present the vMME/MME is not including RRT and sends error code "DIAMETER_ERROR_UNREACHABLE_USER" in TDA message, if paging fails due to any reason as a result after receiving TAU request message (expiry of timer T3412), the MME does not send CMR-update with CMR-Flag value 1. Also, as per 3GPP in the current implementation, the RRT is not included by the vMME/MME when the error code is set to DIAMETER_ERROR_UNREACHABLE_USER. Further, all the MT data which are not delivered as buffered at the SCEF is not again re-tried until the vMME sends a CMR-Update towards the SCEF. Further, the vMME shall send the CMR-Update if and only if the RRT is included in the TDA message. As a result, all the buffered data at SCEF which was to be sent to the UE is not again tried for sending. Further, the specification also specifies that the DIAMETER_ERROR_USER_TEMPORARILY_UNREACHABLE error code is to be included when the UE is using a power-saving mechanism (such as extended idle mode DRX) and the UE is currently not reachable.

Therefore, in the current system, there is a need to have the functionality which can include the RRT in all the TDA message which shall be sent to the SCEF in case of the paging failure with the correct error code. Therefore, in view of these and other existing limitations, there is an imperative need to provide a solution to overcome the limitations of prior existing solutions and to provide methods and systems for management of response time to the at least one NB-IoT device based on the inclusion of the requested retransmission time (RRT) in an MT (Mobile Terminal) Data Answer (TDA).

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide the feature of the RRT that can be included in all the TDA message which shall be sent to SCEF in case of Paging Failure with the correct error code. Another object of the present invention is to provide a system and method where the SCEF may be able to retry an MT Data Requests 32buffered at its end whenever the UE becomes reachable. Further, an object of the present invention is to provide power-saving mode to the NB-IoT devices (i.e. the UE) through dynamic use of the PSM and the eDRX by selection of power-saving modes as per usage (static/dynamic) that can be implemented automatically reducing manual intervention with RRT messaging in the TDA message in case of the paging failure. Further, another object of the present invention is to provide a system and method for use cases where reaching access towards IoT devices is expected anytime during a static active window or a dynamic active window in the PSM or the eDRX. Also, another object of the present invention is to provide a system and method that provide service operators with an ability to use the power saving modes in IoT even in cases of partially unpredictable terminated device access, due to closely tying up of PSM/eDRX with RRT messaging in the TDA message in case of the paging failure. Further, an object of the present invention is to provide a system and method that provide value in area of IoT devices where configuring power saving modes is difficult due to stringent requirements. Another object of the present invention is to provide power-saving solution at low cost and to save power for NB-IoT devices with the device battery life extended. Further, an object of the present invention is to provide power-saving solution where the implementation of power-saving mechanism is automated based on use case, saving efforts of engineering services and cost on devices. Also, another object of the present invention is to provide a system and method for providing solution for optimizing power saving modes for IoT devices to suit real-time use cases, resulting in maximum power saving of devices. Yet another object of the present invention is to provide a system and method for providing a start/end timing information along with PSM/eDRX parameter/s.

In order to achieve the aforementioned objectives, the present invention provides a method and system for management of response time. A first aspect of the present invention relates to a method for management of response time to the at least one NB-IoT device. The method encompasses receiving, at an MME from a SCEF, at least one mobile terminal data request (TDR) generated corresponding to at least one downlink data for at least one NB-IoT device. The method thereafter comprises buffering, at the MME, each of the received at least one mobile terminal data request (TDR). Further, the method comprises calculating, by the MME, a requested retransmission time (RRT) for each of the buffered at least one mobile terminal data request (TDR). The method thereafter comprises transmitting, from the MME to the SCEF, at least one mobile terminal data answer (TDA) corresponding to each of the buffered at least one mobile terminal data request (TDR) for management of response time to the at least one NB-IoT device, wherein the at least one mobile terminal data answer (TDA) comprises of at least the calculated requested retransmission time (RRT) for each of the corresponding buffered at least one mobile terminal data request (TDR).

Another aspect of the present invention relates to a system for management of response time to the at least one NB-IoT device, The system comprises an MME configured to receive from a SCEF, at least one mobile terminal data request (TDR) generated corresponding to at least one downlink data for at least one NB-IoT device. The MME is further configured to buffer, each of the received at least one mobile terminal data request (TDR). Further, the MME is configured to calculate, a requested retransmission time (RRT) for each of the buffered at least one mobile terminal data request (TDR), Thereafter, the MME is configured to transmit to the SCEF, at least one mobile terminal data answer (TDA) corresponding to each of the buffered at least one mobile terminal data request (TDR) for management of response time to the at least one NB-IoT device, wherein the at least one mobile terminal data answer (TDA) comprises of at least the calculated requested retransmission time (RRT) for each of the corresponding buffered at least one mobile terminal data request (TDR).

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
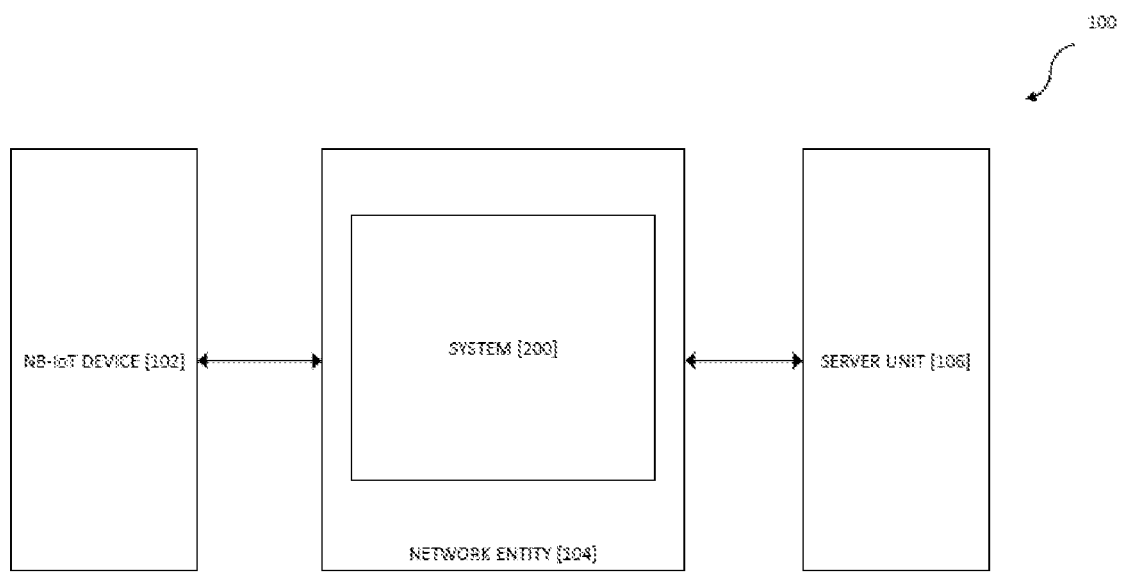
FIG. 1 illustrates an exemplary network architecture diagram [100], in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments, Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be any apparatus that provides specific functionality through electronic components without mechanical parts, the electronic components can include a processor therein to execute software or firmware that confers at least in part the functionality of the electronic components.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ BD); smart card(s), flash memory device(s) (e.g., card, stick, key drive)

As used herein, the terms "IoT sensor device" or "IoT device" or "NB-IoT sensor device" or "NB-IoT Device" or "user equipment (UE)" or "device" and/or the like are employed interchangeably throughout the subject specification and refers to any electrical, electronic, electromechanical and computing device. In an example, the UE may be any chipset-based device which supports eDRX and PSM configurations and also NB-lot. The NB-lot device is capable of receiving and/or transmitting one or parameters, performing function/s, communicating with other IoT sensor devices as well as non-IoT sensor devices and transmitting and/or receiving data from these devices. The IoT sensor device may have a processor, a display, a memory, a battery and an input means such as a hard keypad and/or a soft keypad. The at least one NB-IoT device/IoT sensor device may include, but is not limited to, a thermostat, an electric switch, a washing machine, a computing device, a coffee maker, a refrigerator, a headphone, a lamp, a room sensor, a microwave, a fan, a light and any such device that is obvious to a person skilled in the art. The NB-IoT device may be capable of operating on any radio access technology including but not limited to IP-enabled communication, ZigBee, Bluetooth, Bluetooth Low Energy (BLE), Near Field Communication, Z-Wave, Thread-X etc.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "Mobility Management Entity (MME)" is a control node/unit that processes the signaling between a UE/NB-IoT Device and the core network (CN). Also, in an implementation the MME may include a virtualized MME (vMME) configured to implement the features of the present invention. Further, the protocols running between the UE and the CN are known as the Non-Access Stratum (NAS) protocols. The main functions supported by the MME can be classified as functions related to bearer management—this includes the establishment, maintenance and release of the bearers and is handled by the session management layer in the NAS protocol and functions related to connection management—this includes the establishment of the connection and security between the network and UE and is handled by the connection or mobility management layer in the NAS protocol layer.

As used herein, a "Service Capability Exposure Function (SCEF)" is a module/interface for small data transfers and control messaging between enterprises and the operators' core network (CN). The SCEF provides APIs to the enterprises for the small data transfers and control messages and uses 3GPP-defined interfaces with the network elements in the operators' Core Network in its performance of its functions. The major features of the SCEF are APIs and AAA, External ID, NIDD and Exposing Capabilities for New Revenue. Also, the APIs exposes network capabilities and operators may charge for using the APIs. The APIs enable many use cases for applications by the enterprise.

Hereinafter, exemplary embodiments of the present disclosure will be described in detail with reference to the accompanying drawings so that those skilled in the art can easily carry out the present disclosure.

The present invention provides a solution for management of response time in the area of Narrow Band- Internet of Things (NB-IoT) cell/channel having an area of use in CIoT vEPC. The present invention provides a solution where a feature of requested retransmission time (RRT) is included in all mobile terminal data answer (TDA) messages which shall be sent to a service capability exposure function (SCEF) from a mobility management entity (MME) in case of a paging failure, with a correct error code. The Requested Retransmission Time (RRT) indicates a time at which the MME requests the SCEF to retransmit a mobile terminal data request (TDR). Furthermore, in the paging failure event, the inclusion of the RRT in the TDA messages with the correct error code, enables the MME to transmit to the SCEF, an update request (i.e. a CMR-Update with CMR-Flag value 1), to further receive at the MME from the SCEF one or more mobile terminal data requests (TDRs) in response to corresponding one or more TDA messages transmitted at the SCEF from the MME. The present invention, therefore, enables a synchronization of a response information with the inclusion of Requested Retransmission Time (RRT) in the MT (Mobile Terminal) Data Answer (TDA), from the mobility management entity (MME) to the service capability exposure function (SCEF), in case the MT Data Request is not delivered due to a paging failure. Therefore, the present invention overcomes the limitations of the prior known solutions as the prior known solutions failed to re-try all the MT (Mobile Terminal) Data which are not delivered as buffered at the service capability exposure function (SCEF) due to a failure of sending of a CMR-Update to the SCEF from the mobility management entity (MME).

The present invention is further explained in detail below with reference now to the diagrams.

Referring to FIG. 1, an exemplary network architecture diagram [100], in accordance with exemplary embodiments of the present invention is shown.

As shown in FIG. 1, a NB-IoT device [102] is connected to a network entity [104] and the network entity [104] is further connected to a server unit/application server [106]. Also, the network entity [104] further comprises a system [200] configured to implement various functions of the present invention. Further, the network architecture diagram as indicated in the FIG. 1 depicts an exemplary implementation with the single NB-IoT device [102], the single network entity [104] and the single server unit [106], however, there may be multiple such units or there may be any such numbers of the units, obvious to a person skilled in the art or as required to implement the features of the present disclosure.

The NB-IoT device [102] may include but is not limited to any chipset-based device which supports an extended idle-mode discontinuous reception (eDRX) and a power save mode (PSM) configurations. The NB-IoT device [102] is capable of receiving and/or transmitting one or parameters, performing function/s, communicating with other IoT sensor devices as well as non-IoT sensor devices and transmitting and/or receiving data from these devices. The IoT sensor device may have a processor, a display, a memory, a battery and an input means such as a hard keypad and/or a soft keypad. Some of the examples of such NB-IoT devices [102] are People-Tracker, Smart-meter, bike lock, etc.

Further, the network entity [104] is configured for radio interface transmission and reception. Also, this comprises radio channel modulation/demodulation as well as channel coding/decoding and multiplexing/de-multiplexing. Further, system information is broadcasted in each cell on the radio interface downlink (DL) to provide basic information to UEs (i.e. to the NB-IoT devices [102]) as a prerequisite to access a network. Other functions of the network entity [104] comprises transferring of a dedicated NAS information and a non-3GPP dedicated information, the transfer of UE radio access capability information services and the like. Furthermore, the network entity [104] also comprises the system

[200], wherein the system [200] is configured to implement the features of the present invention for managing a response time to the NB-IoT device/s [102].

Further, the server unit [106] in order to deliver at least one mobile terminal (MT) data to the NB-IoT device [102], is configured to transmit to the network entity [104]/system [200], at least one downlink data. Further, if in an event the server unit [106] transmits to the network entity [104] the at least one downlink data and also if in such event the NB-IoT device [102] is in a connected state, the network entity [104] sends the at least one downlink data in a NAS message to the NB-IoT device [102], to further deliver the at least one MT data to the NB-IoT device [102]. Also, in another event, if the NB-IoT device [102] is not in the connected state (for instance due to a paging failure), the system [200] at the network entity [104] in such event in order to deliver the at least one MT data to the NB-IoT device [102], is configured to manage a response time to the NB-IoT device [102], by implementing the features of the present invention. Furthermore, the server unit [106] also helps a service owner to set an active and a sleep time for the NB-IoT device [102] and depending on values eDRX and PSM timers will be set. The server unit [106] may also provide an NB-IoT device-specific information to a user depending on the NB-IoT device application.

Figure 2:
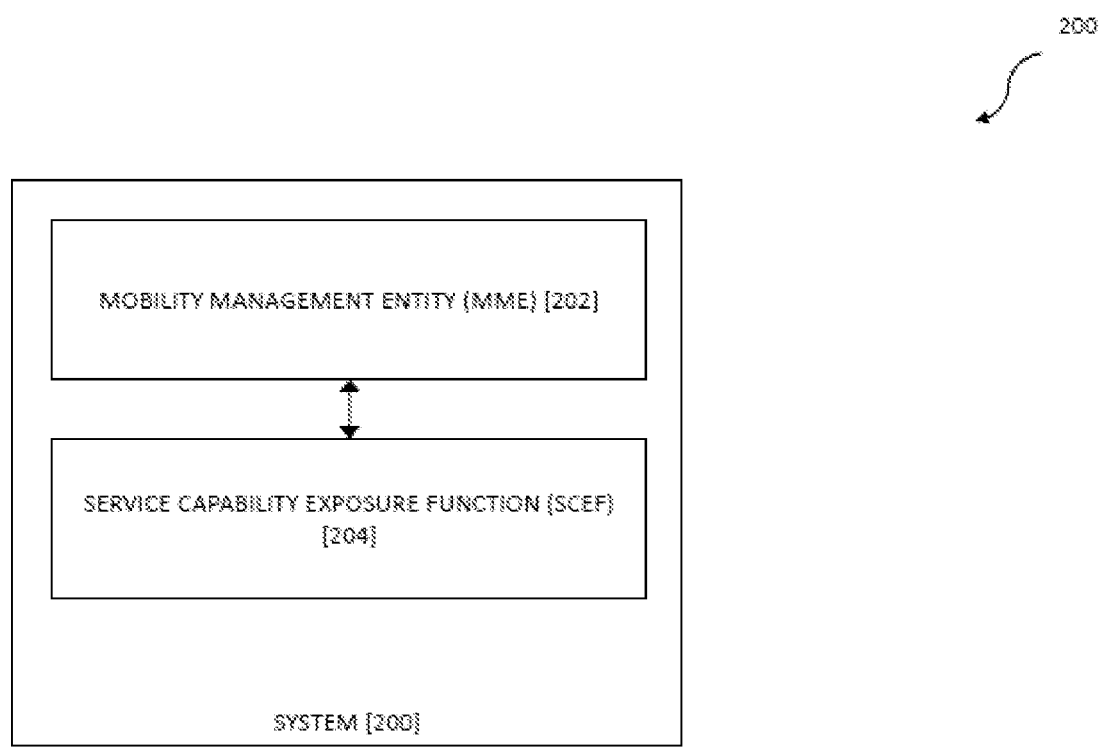
FIG. 2 illustrates an exemplary block diagram of a system [200], for management of response time to at least one NB-IoT device, in accordance with exemplary embodiments of the present invention.

Referring to FIG. 2, an exemplary block diagram of a system [200] for management of response time to at least one NB-IoT device [102], in accordance with exemplary embodiments of the present invention is shown.

The system [200] comprises at least one mobility management entity (MME) [202] and at least one service capability exposure function (SCEF) [204]. In an instance, the system [200] is configured at the network entity [104] and is connected to the at least one NB-IoT device [102] and the server unit [106]. Also, all of the components/units of the system [200] are assumed to be connected to each other unless otherwise indicated below. Also, in FIG. 2 only a few units are shown, however, the system [200] may comprise multiple such units or the system [200] may comprise any such numbers of said units, obvious to a person skilled in the art or as required to implement the features of the present disclosure.

The system [200], is configured to manage response time to the at least one NB-IoT device [102], with the help of the interconnection between the components/units of the system [200].

The at least one mobility management entity (MME) [202] is connected to the at least one service capability exposure function (SCEF) [204]. The mobility management entity (MME) [202] is configured to receive from the service capability exposure function (SCEF) [204], at least one mobile terminal data request (TDR) generated corresponding to at least one downlink data for at least one NB-IoT device [102]. More specifically, firstly the server unit [106] transmits to the SCEF [204], the at least one downlink data to deliver at least one mobile terminal (MT) data at the at least one NB-IoT device [102]. The SCEF [204] upon receipt of the at least one downlink data, is configured to generate the at least one mobile terminal data request (TDR) corresponding to each of the at least one downlink data. Thereafter, the SCEF [204] transmits to the MME [202] the at least one mobile terminal data request (TDR) to deliver the at least one mobile terminal (MT) data to the at least one NB-IoT device [102].

Further, the MME [202] is configured to identify if the at least one NB-IoT device [102] for which the at least one mobile terminal data request (TDR) is received at the MME [202] from the SCEF [204], is in a connected state or not. Further, if the MME [202] identifies that the at least one NB-IoT device [102] is in the connected state, the MME [202] transmits to the at least one NB-IoT device [102] the at least one downlink data in a NAS message and thereby the MME [202] delivers the at least one MT data at the at least one NB-IoT device [102], but if the MME [202] identifies that the at least one NB-IoT device [102] is not in the connected state, the MME [202] in such event is configured to buffer, each of the received at least one mobile terminal data request (TDR).

Furthermore, in the event where the at least one NB-IoT device [102] is not connected in an active state (i.e. the at least one NB-IoT device [102] is not connected when at least one NB-IoT device [102] is not in a PSM or an eDRX mode), the MME [202] is such event is configured to buffer, each of the received at least one mobile terminal data request (TDR) based on a paging cycle between the MME [202] and the at least one NB-IoT device [102]. Further, in such event the each of the received at least one mobile terminal data request (TDR) is buffered at the MME [202] based on a failure of the paging cycle. For example, the MME [202] is configured to buffer each TDR received at the MME [202] from the SCEF [204], when the at least one NB-IoT device [102] is not in the PSM or the eDRX mode but there is a paging failure.

Further, while buffering of the each of the received at least one mobile terminal data request (TDR), the MME [202] is further configured to identify an error code for each of the buffered at least one mobile terminal data request (TDR). For instance, the MME [202] identifies a DIAMETER_ERROR_USER_TEMPORARILY_UNREACHABLE error code for each of the buffered at least one mobile terminal data request (TDR) in the event where the at least one NB-IoT device [102] is not in the PSM or the eDRX mode but there is a paging failure.

Thereafter the MME [202] is configured to calculate, a requested retransmission time (RRT) for each of the buffered at least one mobile terminal data request (TDR). The Requested Retransmission Time (RRT) indicates a time at which the MME [202] requests the SCEF [204] to retransmit a mobile terminal data request (TDR). Further, the requested retransmission time (RRT) for each of the buffered at least one mobile terminal data request (TDR) is calculated based on at least the error code. For example, the MME [202] is configured to calculate the RRT in an event the error code is DIAMETER_ERROR_USER_TEMPORARILY_UNREACHABLE, when the at least one NB-IoT device [102] is not in the PSM or the eDRX mode but there is a paging failure.

Also, the requested retransmission time (RRT) for each of the buffered at least one mobile terminal data request (TDR) is calculated based on at least one of a duration of an active mode of the at least one NB-IoT device [102], a duration of a Power Saving Mode (PSM) of the at least one NB-IoT device [102], and the paging cycle. Furthermore, if a total active time (i.e. duration of the active mode) of the at least one NB-IoT device [102] is "X" sec followed by a PSM of "Y" hrs. Also, if a paging request sent by the MME [202] after receiving a 1st TDR is sent when "Z" sec of the active time is remaining & there is paging failure, then RRT is calculated as:

RRT=Remaining Active Time+PSM time i.e.

RRT=Z sec+Y hrs.

Further, the MME [202] is configured to transmit to the SCEF [204], at least one mobile terminal data answer (TDA) corresponding to each of the buffered at least one mobile terminal data request (TDR) for management of response time to the at least one NB-IoT device [102]. Further, the at least one mobile terminal data answer (TDA) comprises of at least the calculated requested retransmission time (RRT) for each of the corresponding buffered at least one mobile terminal data request (TDR). Also, the at least one mobile terminal data answer (TDA) further comprises of at least the identified error code for each of the corresponding buffered at least one mobile terminal data request (TDR). For example, a mobile terminal data answer (TDA) may comprise an error code DIAMETER_ERROR_USER_TEMPORARILY_UNREACHABLE and a calculated RRT time (for instance the Z sec+Y hrs).

Further, the MME [202] is configured to receive, a tracking area update (TAU) request from the at least one NB-IoT device [102]. The MME [202] receives the TAU update request on the basis of an expiry of a timer. For instance, when a timer T3412 expires, the MME [202] receives from the at least one NB-IoT device [102] the TAU update request. The MME [202] is thereafter configured to transmit to the SCEF [204], an update message based on the tracking area update request received at the MME [202]. For example, when the timer T3412 expires, the MME [202] sends towards the SCEF [204], a CMR-Update with CMR Flag=1 based on the tracking area update request received at the MME [202] upon expiry of the timer T3412.

Further, the MME [202] is configured to receive from the SCEF [204], at least one mobile terminal data request (TDR) in response to the update message. Also, the at least one mobile terminal data request (TDR) in response to the update message is received at the MME [202] from the SCEF [204] for each of the corresponding at least one mobile terminal data answer (TDA), wherein the at least one mobile terminal data answer (TDA) are buffered at the SCEF [204]. Thereafter, the MME [202] sends the at least one mobile terminal data request (TDR) received in response to the update message to the at least one NB-IoT device [102], over a NAS, based on a successful paging event. For example, once the SCEF [204] receives from the MME [202] the at least one mobile terminal data answer (TDA) corresponding to each of the at least one mobile terminal data request (TDR) buffered at the MME [202], the SCEF [204] buffers each of the at least one mobile terminal data answer (TDA). Further, upon receipt of the CMR-Update from the MME [202] at the SCEF [204], the SCEF [204] retries buffered MT data corresponding to the each of the buffered at least one mobile terminal data answer (TDA), thereby the MME [202] receives from the SCEF [204] the at least one mobile terminal data request (TDR) in response to the update message. Thereafter, upon a successful paging, all the TDRs at the MME [202] are further sent to the at least one NB-IoT device [102] over a NAS.

Figure 3:
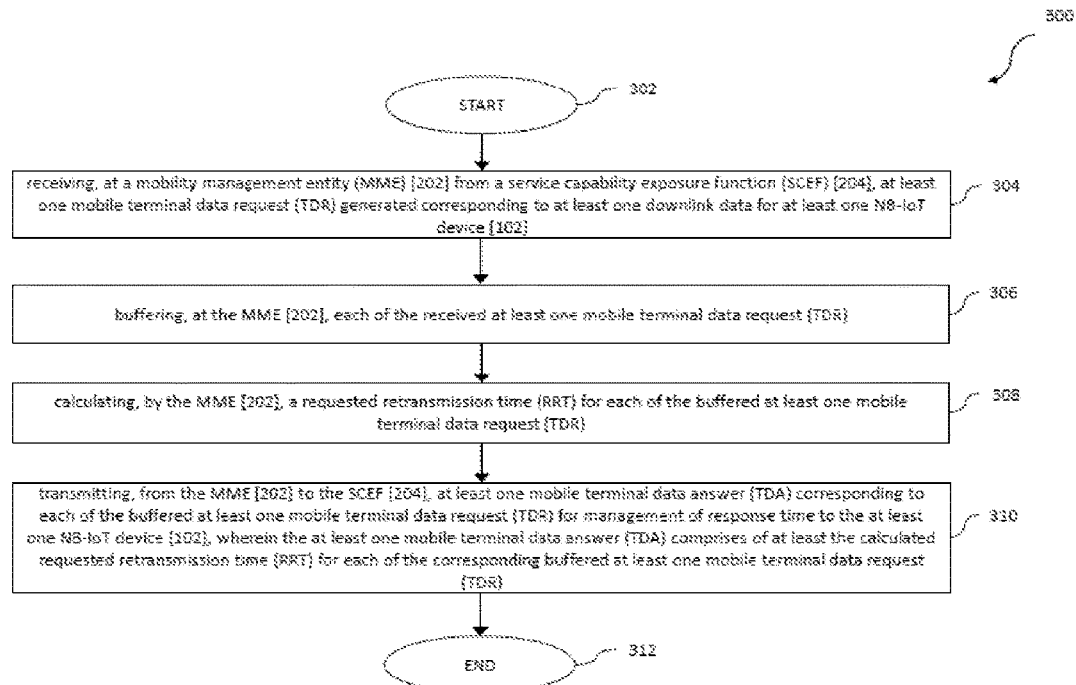
FIG. 3 illustrates an exemplary method flow diagram depicting a method [300], for management of response time to at least one NB-IoT device, in accordance with exemplary embodiments of the present invention.

Referring to FIG. 3, an exemplary method flow diagram depicting a method [300], for management of response time to at least one NB-IoT device [102], in accordance with exemplary embodiments of the present invention is shown. In an instance, the method is implemented at a network entity [104] comprising at least one mobility management entity (MME) [202] and at least one service capability exposure function (SCEF) [204], wherein the network entity [104] is connected to the at least one NB-IoT device [102] and a server unit [106]. As shown in FIG. 3, the method begins at step [302].

At step [304], the method comprises receiving, at the mobility management entity (MME) [202] from the service capability exposure function (SCEF) [204], at least one mobile terminal data request (TDR) generated corresponding to at least one downlink data for at least one NB-IoT device [102]. More specifically, the method firstly encompasses transmitting via the server unit [106] to the SCEF [204], the at least one downlink data to deliver at least one mobile terminal (MT) data at the at least one NB-IoT device [102]. Thereafter, the SCEF [204] upon receipt of the at least one downlink data generates the at least one mobile terminal data request (TDR) corresponding to each of the at least one downlink data. Thereafter, the method encompasses receiving from the SCEF [204] at the MME [202], the generated at least one mobile terminal data request (TDR), to deliver the at least one mobile terminal (MT) data to the at least one NB-IoT device [102].

Further, the method encompasses identifying via the MME [202], whether the at least one NB-IoT device [102] for which the at least one mobile terminal data request (TDR) is received at the MME [202] from the SCEF [204], is in a connected state or not. If the MME [202] identifies that the at least one NB-IoT device [102] is in the connected state, the MME [202] transmits to the at least one NB-IoT device [102] the at least one downlink data in a NAS message and thereby the MME [202] delivers the at least one MT data at the at least one NB-IoT device [102], but if the MME [202] identifies that the at least one NB-IoT device [102] is not in the connected state, the method in such event encompasses buffering each of the received at least one TDR at the MME [202].

Thereafter, the method at step [306] comprises buffering, at the MME [202], each of the received at least one mobile terminal data request (TDR), in the event where the at least one NB-IoT device [102] is not connected in an active state (i.e. the at least one NB-IoT device [102] is not connected when at least one NB-IoT device [102] is not in a PSM or an eDRX mode). Further, the buffering, at the MME [202], each of the received at least one mobile terminal data request (TDR) is based on a paging cycle between the MME [202] and the at least one NB-IoT device [102]. Furthermore, each of the received at least one mobile terminal data request (TDR) is buffered at the MME [102] based on a failure of the paging cycle. For instance, the method comprises buffering via the MME [202], each of the TDR received at the MME [202] from the SCEF [204], when the at least one NB-IoT device [102] is not in the PSM or the eDRX mode but there is a paging failure.

Also, the method at the step of buffering each of the received at least one mobile terminal data request (TDR) at the MME [102], further comprises identifying an error code for each of the buffered at least one mobile terminal data request (TDR). For instance, the method encompasses identifying via the MME [202], a DIAMETER_ERROR_USER_TEMPORARILY_UNREACHABLE error code for each of the buffered at least one mobile terminal data request (TDR) in the event where the at least one NB-IoT device [102] is not in the PSM or the eDRX mode but there is a paging failure.

The method thereafter at step [308] comprises calculating, by the MME [202], a requested retransmission time (RRT) for each of the buffered at least one mobile terminal data request (TDR). The Requested Retransmission Time (RRT) indicates a time at which the MME [202] requests the SCEF [204] to retransmit a mobile terminal data request (TDR). Further, the requested retransmission time (RRT) for each of the buffered at least one mobile terminal data request (TDR)

is calculated based on at least the error code. For example, the method encompasses calculating via the MME [202] the RRT in an event the error code is DIAMETER_ERROR_USER_TEMPORARILY_UNREACHABLE, when the at least one NB-IoT device [102] is not in the PSM or the eDRX mode but there is a paging failure.

Also, the requested retransmission time (RRT) for each of the buffered at least one mobile terminal data request (TDR) is calculated based on at least one of a duration of an active mode of the at least one NB-IoT device [102], a duration of a Power Saving Mode (PSM) of the at least one NB-IoT device [102], and the paging cycle. For instance, if a total active time of the at least one NB-IoT device [102] is 12 sec followed by a PSM of 19 hrs. Also, if a paging request sent by the MME [202] after receiving a 1st TDR is sent when 7 sec of the active time is remaining & there is paging failure, then RRT is calculated as:

RRT=Remaining Active Time+PSM time i.e.

RRT=7 sec+19 hrs. (i.e. 19 hours 7 seconds)

Thereafter, the method at step [310] comprises transmitting, from the MME [202] to the SCEF [204], at least one mobile terminal data answer (TDA) corresponding to each of the buffered at least one mobile terminal data request (TDR) for management of response time to the at least one NB-IoT device. Further, the at least one mobile terminal data answer (TDA) comprises of at least the calculated requested retransmission time (RRT) for each of the corresponding buffered at least one mobile terminal data request (TDR). Also, the at least one mobile terminal data answer (TDA) further comprises of at least the identified error code for each of the corresponding buffered at least one mobile terminal data request (TDR). For example, a mobile terminal data answer (TDA) may comprise an error code DIAMETER_ERROR_USER_TEMPORARILY_UNREACHABLE and a calculated RRT time (for instance the 7 sec Remaining Active Time+19 hrs PSM time).

Further, the method comprises receiving, at the MME [202], a tracking area update request from the at least one NB-IoT device [102].

The method encompasses receiving at the MME [202] the TAU update request on the basis of an expiry of a timer. For instance, when a timer T3412 expires, the MME [202] receives from the at least one NB-IoT device [102] the TAU update request.

The method thereafter comprises transmitting, from the MME [202] to the SCEF [204], an update message based on the tracking area update request received at the MME [202]. For example, when the timer T3412 expires, the MME [202] sends towards the SCEF [204], a CMR-Update with CMR Flag=1 based on the tracking area update request received at the MME [202] upon expiry of the timer T3412.

Further, the method comprises receiving, at the MME [202] from the SCEF [204], at least one mobile terminal data request (TDR) in response to the update message. Also, the at least one mobile terminal data request (TDR) in response to the update message is received at the MME [202] from the SCEF [204] for each of the corresponding at least one mobile terminal data answer (TDA), wherein the at least one mobile terminal data answer (TDA) are buffered at the SCEF [204]. Thereafter, the method comprises sending via the MME [202], the at least one mobile terminal data request (TDR) received in response to the update message, to the at least one NB-IoT device [102] over a NAS, based on a successful paging event. For example, once the SCEF [204] receives from the MME [202] the at least one mobile terminal data answer (TDA) corresponding to each of the at least one mobile terminal data request (TDR) buffered at the MME [202], the SCEF [204] buffers each of the at least one mobile terminal data answer (TDA). Further, upon receipt of the CMR-Update from the MME [202] at the SCEF [204], the SCEF [204] retries each of the buffered MT data corresponding to the each of the buffered at least one mobile terminal data answer (TDA), thereby the MME [202] receives from the SCEF [204] the at least one mobile terminal data request (TDR) in response to the update message. Thereafter, upon a successful paging, all the TDRs at the MME [202] are further sent to the at least one NB-IoT device [102] over a NAS.

The method thereafter terminates at step [312].

Figure 4:
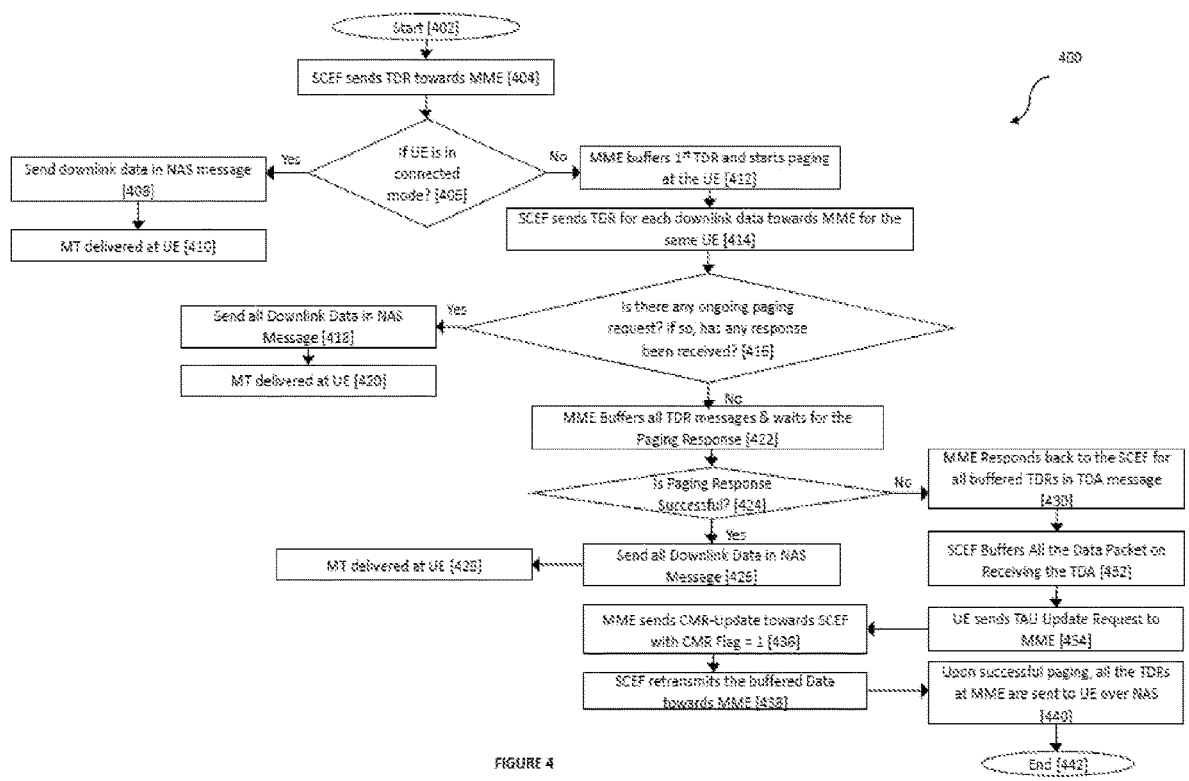
FIG. 4 illustrates an exemplary flow diagram [400], depicting an instance implementation of the process of management of response time to at least one NB-IoT device, in accordance with exemplary embodiments of the present invention.

Referring to FIG. 4 an exemplary flow diagram [400], depicting an instance implementation of the process of management of response time to at least one NB-IoT device [102], in accordance with exemplary embodiments of the present invention is shown. As shown in FIG. 4, the method begins at step [402].

At step [404], the method of the exemplary process encompasses sending via a SCEF [204], at least one TDR, towards a MME [202]. The SCEF [204] sends to the MME [202], the at least one TDR in an event at least one downlink data is received at the SCEF [204] from a server unit (i.e, from an application server) [106], to deliver at least one mobile terminal (MT) data to a UE (i.e. an NB-IoT device [102]).

Next, at step [406] the method comprises checking via the MME [202] if the UE [102] is in a connected state or not. Further, if the UE [102] is identified to be in the connected state the method leads to step [408], otherwise, the method leads to the step [412].

Next, at step [408] the method comprises sending via the MME [202] the at least one downlink data in a NAS message towards the UE [102]. Further, the method leads to the step [410] and at step [410] the method delivers the at least one mobile terminal (MT) data to the UE [102].

Next, at step [412] the method comprises buffering via the MME [202] a first received TDR based on the event indicating the UE [102] is not in a PSM or an eDRX but there is a Paging Failure (i.e. the UE [102] is not in the connected state during an active state of the UE [102]). Also, the method at step [412] further encompasses initiating via the MME [202], a paging cycle at the UE [102].

Next, at step [414] the method comprises sending via the SCEF [204], a TDR for each downlink data towards the MME [202] for the same UE [102]. For instance, the 2nd, 3rd, 4th & so on downlink data from the server unit [106] to the SCEF [204] is received and thereafter the SCEF [204] sends the TDR for each downlink data towards the MME [202] for the same. UE [102].

Next, at step [416] the method comprises checking via the MME [202] if there is any ongoing paging request and if so, has any response been received for the same. Further in an event, the ongoing paging request with the received response is identified via the MME [202] the method further leads to step [418], otherwise, the method leads to step [420].

Next, at step [418] the method comprises sending via the MME [202] all the downlink data in the NAS message towards the UE [102]. Further, the method leads to the step [420] and at step [420] the method delivers the mobile terminal (MT) data to the UE [102].

Next, at step [422] the method comprises buffering at the MME [202] all the TDRs received at the MME [202] from the SCEF [204], Also, the method at step [422] thereafter encompasses waiting at the MME [202] for a paging response.

Next, at step [424] the method comprises checking whether the paging response is successful or not. Further, if the paging response is successful the method leads to the step [426], otherwise, the method leads to step [430].

Next, at step [426] the method comprises sending via the MME [202] all the downlink data in the NAS message towards the UE [102]. Further, the method leads to the step [428] and at step [428] the method delivers the mobile terminal (MT) data to the UE [102].

Next, at step [430] the MME [202] responds back to the SCEF [204] for all buffered TDRs in corresponding TDA messages. For example, the MME [202] responds back to the SCEF [204] for all buffered TDRs in the corresponding TDA messages, each with cause: DIAMETER_ERROR_USER_TEMPORARILY_UNREACHABLE (5653) and with a correct/calculated RRT (Requested Retransmission Time) value.

Next, at step [432], the method encompasses buffering at the SCEF [204], all data packets upon receiving their corresponding TDAs with the cause: DIAMETER_ERROR_USER_TEMPORARILY_UNREACHABLE (5653) and the calculated RRT value.

Next, at step [434] the method comprises receiving at the MME [202], a TAU update request from the. UE [102], wherein the TAU update request is received on the basis of an expiry of a timer (such as a T3412 timer)

Next, at step [436] the MME [202] sends towards the SCEF [204], an update request (i.e. a CMR-Update with CMR Flag=1), based on the receipt of the TAU update request at the MME [202].

Next, at step [438] the method comprises receiving at the SCEF [204] from the MME [202], the update request (i.e. the CMR-Update message with Flag=1) and also thereafter retransmitting each of the buffered data (TDRs) towards the MME [202] from the SCEF [204].

Next, at step [440] the method comprises receiving at the MME [202] from the SCEF [204], the buffered TDRs. Also, the method thereafter encompasses initiating a paging cycle via the MME [202] at the UE [102]. Further, upon successful paging, all the TDRs at the MME [202] are then sent to the UE [102] over the NAS.

The method thereafter terminates at step [442].

Figure 5:
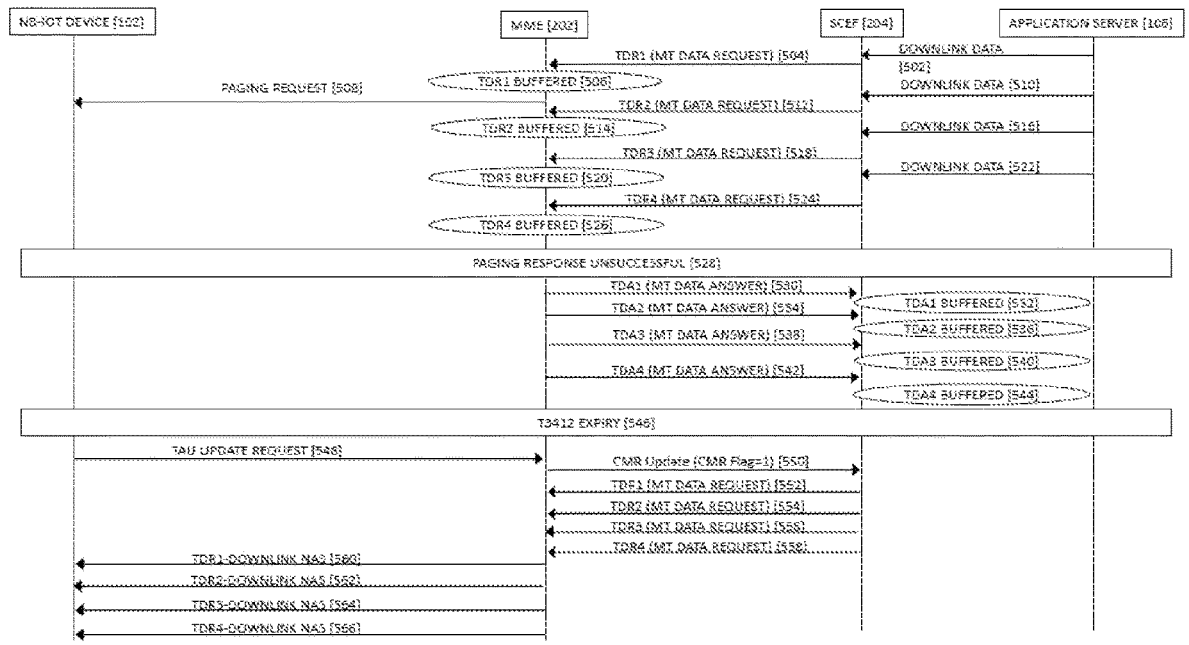
FIG. 5 illustrates an exemplary sequence diagram, depicting an instance implementation of the process of management of response time to at least one NB-IoT device, in accordance with exemplary embodiments of the present invention.

Referring to FIG. 5 an exemplary sequence diagram, depicting an instance implementation of the process of management of response time to at least one NB-IoT device [102], in accordance with exemplary embodiments of the present invention is shown.

In FIG. 5, at step [502] an application server (i.e. a server unit [106]) transmits a first downlink data to a SCEF [204].

Next, at step [504] the SCEF [204] transmits to MME [202], a mobile terminal data request (TDR 1) corresponding to the received first downlink data. Further, at step [506] the MME buffers the TDR1 based on an event where an NB-IoT device [102] is not in a PSM or an eDRX mode but there is a paging failure.

Next, at step [508] the MME [202] initiates a paging cycle at the NB-IoT device [102] by sending a paging request at the NB-IoT device [102]. Further, at step [510] the application server [104] transmits a second downlink data to the SCEF [204]. The SCEF [204] thereafter, at step [512] transmits to the MME [202], a mobile terminal data request (TDR2) corresponding to the received second downlink data. Further, at step [514], the MME [202] while waiting for a paging response, buffers the received TDR2.

Next, at step [516] the application server [104] transmits a third downlink data to the SCEF [204]. The SCEF [204] thereafter, at step [518] transmits to the MME [202], a mobile terminal data request (TDR3) corresponding to the received third downlink data. Further, at step [520], the MME [202] while waiting for a paging response, buffers the received TDR3.

Next, at step [522] the application server [104] transmits a fourth downlink data to the SCEF [204]. The SCEF [204] thereafter, at step [524] transmits to the MME [202], a mobile terminal data request (TDR4) corresponding to the received fourth downlink data. Further, at step [526], the MME [202] while waiting for a paging response, buffers the received TDR4.

Next, at step [528] the method encompasses receiving a paging response unsuccessful indication in response to the paging cycle initiated via the MME [202].

Next, at step [530] the method based on the implementation of the features of the present invention, transmits from the MME [202] to the SCEF [204], a TDA1. (MT DATA ANSWER) message corresponding to the TDR1 buffered at the MME [202]. Further, the TDA1 message comprises: DIAMETER_ERROR_USER_TEMPORARILY_UNREACHABLE (5653) RRT Included, wherein the RRT is calculated as remaining active timer+PSM time. The SCEF [204] thereafter at step [532], buffers the TDA1 message for retransmission.

Also, at step [534] the method based on the implementation of the features of the present invention, transmits from the MME [202] to the SCEF [204] a TDA2 (MT DATA ANSWER) message corresponding to the TDR2 buffered at the MME [202]. Further, the TDA2 message comprises: DIAMETER_ERROR_USER_TEMPORARILY_UNREACHABLE (5653) RRT Included, wherein the RRT is calculated as remaining active timer+PSM time. The SCEF [204] thereafter at step [536], buffers the TDA2 message for retransmission.

Next, at step [538] the method based on the implementation of the features of the present invention, transmits from the MME [202] to the SCEF [204] a TDA3 (MT DATA ANSWER) message corresponding to the TDR3 buffered at the MME [202]. Further, the TDA3 message comprises: DIAMETER_ERROR_USER_TEMPORARIL.Y_UNREACHABLE (5653) RRT Included, wherein the RRT is calculated as remaining active timer+PSM time. The SCEF [204] thereafter at step [540], buffers the TDA3 message for retransmission, Next, at step [542] the method based on the implementation of the features of the present invention, transmits from the MME [202] to the SCEF [204] a TDA4 (MT DATA ANSWER) message corresponding to the TDR4 buffered at the MME [202]. Further, the TDA4 message comprises: DIAMETER_ERROR_USER_TEMPORARILY_UNREACHABLE (5653) RRT Included, wherein the RRT is calculated as remaining active timer+PSM time. The SCEF [204] thereafter at step [544], buffers the TDA4 message for retransmission.

Next, at step [546] the method receives a timer T3412 expiry indication. Further, at step [548], the MME [202] based on the expiry of the timer T3412 further receives from the NB-IoT device [102], a TAU update request.

Next, at step [550] the MME [202] upon receipt of the TAU update request, transmits to the SCEF [204], a CMR Update with CMR Flag=1.

Further, the SCEF [204] upon receipt of the CMR Update with CMR Flag=1, transmits to the MME [202], TDRs corresponding to each of the buffered TDAs. Next, at step

[552], the SCEF [204] transmits to the MME [202], a TDR1 (MT data request) corresponding to the buffered TDA1. Also, at step [554], the SCEF [204] transmits to the MME [202], a TDR2 (MT data request) corresponding to the buffered TDA2, Further, at step [556], the SCEF [204] transmits to the MME [202], a TDR3 (MT data request) corresponding to the buffered TDA3. Also, at step [560], the SCEF [204] transmits to the MME [202], a TDR4 (MT data request) corresponding to the buffered TDA4.

Thereafter, the MME [202] initiates a paging cycle at the NB-IoT device [102] and the MME [202] in an event of successful paging response transmits all the TDRs received in response to the transmitted TDAs, to the NB-IoT device [102], over NAS message. Therefore, the MME [202] in the event of successful paging response, at step [560], [562], [564] and [566] transmits to the NB-IoT device [102], the TDR1-downlink NAS, TDR2-downlink NAS, TDR3-downlink NAS and TDR4-downlink NAS.

Therefore, upon receipt of all the TDR-downlink NAS at the NB-IoT device [102], the MT data is received successfully at the NB-IoT device [102] based on the implementation of the present invention.

Figure 6:
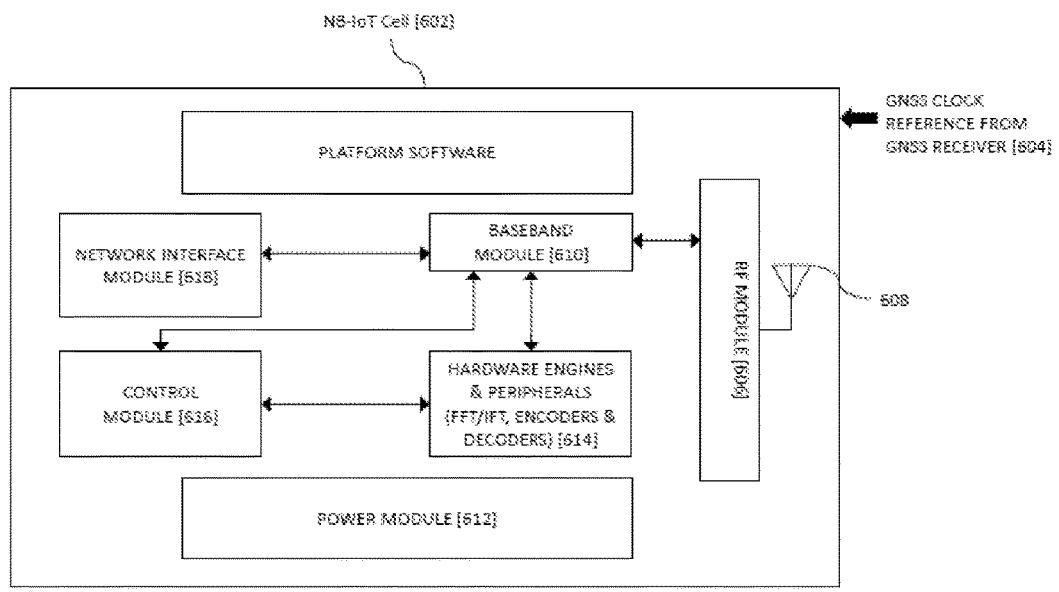
FIG. 6 illustrates an exemplary block diagram of an NB-IoT cell, in accordance with exemplary embodiments of the present invention.

Referring to FIG. 6, an exemplary block diagram of an NB-IoT cell, in accordance with exemplary embodiments of the present invention is shown. FIG. 6, depicts the NB-IoT cell [602]. Further in the FIG. 6, [606] is the NB-IoT radio interface that along with radio antenna [608] provides a wireless access to NB-IoT client devices according to the 3GPP NB-IoT protocols. Also, [616] is an access point control module which is responsible for managing and provisioning an NB-IoT wireless access point. Further, [610] and [618] are NB-IoT processors running a protocol stack. Also, [604] is an interface for receiving a clock reference, [612] is a power module and [614] depicts hardware engines and peripherals (FFT/IFT, encoders & decoders)

Furthermore, in one of the embodiments, the system and method described above in the disclosure can be applied in a Long-Term Evolution Machine Type Communications Category M1 (LTE MTC Cat M1, also referred to as LTE-M), a 5G-Evolved Machine Type Communications (eMTC) and any other such communication known to person skilled in the art.

Thus, the present invention provides a novel solution for the technical problem of failure of retransmission of mobile terminal (MT) Data at an NB-IoT device in an event the NB-lot device is not in a PSM or an eDRX mode but there is a Paging Failure. Furthermore, the present invention encompasses managing a response time to the NB-IoT device by transmitting from an MME to a SCEF, at least one mobile terminal data answer (TDA) comprising RRT and an error code DIAMETER_ERROR_USER_TEMPORARILY_UNREACHABLE, when the device is not in the PSM or the eDRX but there is a Paging Failure. Furthermore, the present invention enables a synchronization of a response information with the inclusion of Requested Retransmission Time (RRT) in the MT (Mobile Terminal) Data Answer (TDA) from the MME to the SCEF in case an MT Data Request is not delivered due to the Paging Failure.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for managing transmission of at least one downlink data to at least one Narrow Band-Internet of Things (NB-IoT device) responsive to a failure of a paging cycle, the method comprises:
   receiving, at a mobility management entity (MME) from a service capability exposure function (SCEF), at least one mobile terminal data request (TDR) generated corresponding to the at least one downlink data for the at least one NB-IoT device;
   buffering, at the MME, each of the received at least one mobile terminal data request (TDR);
   calculating, by the MME, a requested retransmission time (RRT) for each of the buffered at least one mobile terminal data request (TDR); and
   responsive to the failure of the paging cycle, transmitting, from the MME to the SCEF, at least one mobile terminal data answer (TDA) corresponding to each of the buffered at least one mobile terminal data request (TDR) for managing transmission of the at least one downlink data to the at least one NB-IoT device, wherein the at least one mobile terminal data answer (TDA) comprises of at least the calculated requested retransmission time (RRT) for each of the corresponding buffered at least one mobile terminal data request (TDR).

2. The method as claimed in claim 1, wherein:
   buffering, at the MME, each of the received at least one mobile terminal data request (TDR) is based on the paging cycle between the MME and the at least one NB-IoT device, and
   the requested retransmission time (RRT) for each of the buffered at least one mobile terminal data request (TDR) is calculated based on at least one of a duration of an active mode of the at least one NB-IoT device, a duration of a Power Saving Mode (PSM) of the at least one NB-IoT device, and the paging cycle.

3. The method as claimed in claim 2, wherein each of the received at least one mobile terminal data request (TDR) is buffered at the MME based on failure of the paging cycle, the step of buffering each of the received at least one mobile terminal data request (TDR) at the MME further comprises:
   identifying an error code for each of the buffered at least one mobile terminal data request (TDR), wherein the requested retransmission time (RRT) for each of the buffered at least one mobile terminal data request (TDR) is calculated based on at least the error code, and the at least one mobile terminal data answer (TDA) further comprises of at least the identified error code for each of the corresponding buffered at least one mobile terminal data request (TDR).

4. The method as claimed in claim 1, the method further comprises:
   receiving, at the MME, a tracking area update request from the at least one NB-IoT device;
   transmitting, from the MME to the SCEF, an update message based on the tracking area update request received at the MME; and
   receiving, at the MME from the SCEF, at least one mobile terminal data request (TDR) in response to the update message.

5. The method as claimed in claim 4, wherein the at least one mobile terminal data request (TDR) in response to the update message is received at the MME from the SCEF for each of the corresponding at least one mobile terminal data answer (TDA), wherein the at least one mobile terminal data answer (TDA) are buffered at the SCEF.

6. The system as claimed in claim 1, wherein the MME is further configured to:
receive, a tracking area update request from the at least one NB-IoT device;
transmit to the SCEF, an update message based on the tracking area update request received at the MME; and
receive from the SCEF, at least one mobile terminal data request (TDR) in response to the update message.

7. The system as claimed in claim 6, wherein the at least one mobile terminal data request (TDR) in response to the update message is received at the MME from the SCEF for each of the corresponding at least one mobile terminal data answer (TDA), wherein the at least one mobile terminal data answer (TDA) are buffered at the SCEF.

8. A system for management of transmission of at least one downlink data to at least one Narrow Band-Internet of Things (NB-IoT device) responsive to a failure of a paging cycle, the system comprises:
a mobility management entity (MME) configured to:
receive from a service capability exposure function (SCEF), at least one mobile terminal data request (TDR) generated corresponding to the at least one downlink data for at least one NB-IoT device;
buffer, each of the received at least one mobile terminal data request (TDR);
calculate, a requested retransmission time (RRT) for each of the buffered at least one mobile terminal data request (TDR); and
responsive to the failure of the paging cycle, transmit to the SCEF, at least one mobile terminal data answer (TDA) corresponding to each of the buffered at least one mobile terminal data request (TDR) for management of transmission of the at least one downlink data to the at least one NB-IoT device, wherein the at least one mobile terminal data answer (TDA) comprises of at least the calculated requested retransmission time (RRT) for each of the corresponding buffered at least one mobile terminal data request (TDR).

9. The system as claimed in claim 8, wherein:
the MME is further configured to buffer, each of the received at least one mobile terminal data request (TDR) based on a paging cycle between the MME and the at least one NB-IoT device, and
the requested retransmission time (RRT) for each of the buffered at least one mobile terminal data request (TDR) is calculated based on at least one of a duration of an active mode of the at least one NB-IoT device, a duration of a Power Saving Mode (PSM) of the at least one NB-IoT device, and the paging cycle.

10. The system as claimed in claim 9, wherein each of the received at least one mobile terminal data request (TDR) is buffered at the MME based on the failure of the paging cycle, and at the step of buffering of each of the received at least one mobile terminal data request (TDR), the MME is further configured to:
identify an error code for each of the buffered at least one mobile terminal data request (TDR), wherein the requested retransmission time (RRT) for each of the buffered at least one mobile terminal data request (TDR) is calculated based on at least the error code, and the at least one mobile terminal data answer (TDA) further comprises of at least the identified error code for each of the corresponding buffered at least one mobile terminal data request (TDR).

* * * * *